(12) United States Patent
Shin et al.

(10) Patent No.: US 7,643,215 B2
(45) Date of Patent: Jan. 5, 2010

(54) HEAD UP DISPLAY DEVICE

(75) Inventors: Sung Chul Shin, Gyeonggi-do (KR);
Young Woon Kim, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 11/949,606

(22) Filed: Dec. 3, 2007

(65) Prior Publication Data

US 2009/0141363 A1 Jun. 4, 2009

(30) Foreign Application Priority Data

Dec. 4, 2006 (KR) ...................... 10-2006-0121175

(51) Int. Cl.
*G02B 27/14* (2006.01)
*B60Q 1/00* (2006.01)
*G03B 21/00* (2006.01)
*G02F 1/13351* (2006.01)

(52) U.S. Cl. .................. 359/630; 340/438; 353/11; 349/11

(58) Field of Classification Search ......... 359/630–634, 359/13–14; 345/7, 9; 348/115; 353/11–12, 353/28, 119; 349/11; 340/438, 980, 995.1, 340/815.47, 815.74

See application file for complete search history.

(56) References Cited

U.S. PATENT DOCUMENTS

| 5,640,275 | A | | 6/1997 | Bourguignat et al. |
| 5,677,701 | A | * | 10/1997 | Okuyama et al. ............. 345/7 |
| 5,729,366 | A | * | 3/1998 | Yang ........................... 359/13 |
| 5,864,326 | A | * | 1/1999 | Rallison ........................ 345/7 |
| 6,111,701 | A | | 8/2000 | Brown |
| 2002/0089757 | A1 | | 7/2002 | Bignolles et al. |

FOREIGN PATENT DOCUMENTS

WO   WO-94/20874 A1   9/1994

* cited by examiner

*Primary Examiner*—Scott J Sugarman
*Assistant Examiner*—Dawayne A Pinkney
(74) *Attorney, Agent, or Firm*—Birch, Stewart, Kolasch & Birch, LLP

(57) ABSTRACT

An external mounting type head up display device for a vehicle, which can be mounted irrespective of kind of vehicle, is disclosed. The head up display device includes a display unit to convert a signal into an image and output the image, an optical element decentered with respect to an optical axis of the display unit, the optical element magnifying the image and transmitting the image, and a combiner provided in front of a driver to provide the driver with the transmitted magnified image.

16 Claims, 4 Drawing Sheets

HEAD UP DISPLAY DEVICE

This application claims the benefit of Korean Patent Application No. 10-2006-0121175, filed on Dec. 4, 2006, which is hereby incorporated by reference as if fully set forth herein.

BACKGROUND OF THE INVENTION

1. Field of the Invention

The present invention relates to a head up display device, and more particularly, to an external mounting type head up display device for a vehicle, which can be mounted to a vehicle irrespective of kind of vehicle.

2. Discussion of the Related Art

There are several safety systems under development for the purpose of effectively providing a driver with information about vehicle driving states and surrounding circumstances to secure safe driving. Of the safety systems, a head up display (HUD) device is highlighted.

A HUD device is used to provide a driver with information about vehicle driving states and navigation to the front of a driver, i.e., within a driver's view range while driving a vehicle.

An initially developed HUD device was installed in an airplane, especially a fighting plane, for the purpose of providing a pilot with flight information while flying. A HUD device for a vehicle has been developed by applying an initial HUD device for an airplane to a vehicle.

For example, in a case where a driver drives a vehicle at a speed of approximately 100 km/h, on the assumption that it takes approximately two seconds for the driver to divert observation to the road after checking information on a dashboard, the vehicle travels about 55 m in the mean time, which may cause a car accident.

As one of methods for decreasing accident risk, a HUD device for a vehicle has been developed. A HUD device for a vehicle displays dashboard information (speed, driving distance, RPM, etc.) on a windshield within a driver's view range, thereby enabling the driver to perceive important information about vehicle driving states without taking eyes off the road. Accordingly, the driver can drive a vehicle safely.

FIG. 1 is a view illustrating an example of a constitution of a conventional head up display device.

As shown in the drawing, a conventional head up display device includes a display unit 11 to display information about vehicle driving states and navigation, a projection unit 13 to project an image outputted from the display unit 11, and a combiner 15 mounted on a windshield 14 to reflect the image projected from the projection unit 13 to a driver in a holographic image form. Depending on the necessities, a mirror system 12, which changes an optical path of the image, may be installed between the display unit 11 and the projection unit 13.

The display unit 11 may include a light source using an ultra high pressure (UHP) lamp, an LED or a laser, and a display panel capable of microdisplay and scan display, such as an LCD, an LCOS or a DMD. In this case, the image outputted from the display unit 11 should have high surface brightness so that the image is visible in broad clear daylight. The projection unit 13 is an optical system that projects the image from the display unit 11 to the combiner 15. The projection unit 13 generally includes plural lenses. The combiner 15 is provided with a recording layer which is formed with a hologram pattern so that the combiner 15 has a high transmittance for light incident from the exterior of the vehicle and has a high reflectance for light incident from the display unit 11 and the projection unit 13.

According to the conventional head up display device as structured above, as shown in FIG. 2, the information about vehicle driving states and navigation is outputted from the display unit 11 in the image form, and the outputted image is projected to the windshield 14 by the projection unit 22 (illustrated to include a mirror system). The image projected to the windshield 14 is reflected from the combiner 15 to the driver's eyes. The image transmitted to the driver's eyes appears as a virtual image (HUD image) 21 at a predetermined distance, preferably 2.4 m or more, from the driver, with a lookdown angle θ from the horizontal sight line. Accordingly, the driver sees the virtual image overlapped with outside scenery viewed through the windshield. It is preferred that the lookdown angle θ is set within a range from approximately 10 to 15°, in order for the driver to easily observe the image of the information about the vehicle driving states and the like without confusing the image with the outside scenery.

However, as shown in FIG. 2, the conventional head up display device as structured above is configured such that the at least display unit 11 and projection unit 22 are mounted inside the dashboard of the vehicle. In other words, the conventional head up display device is manufactured adequately only for an internal mounting type which should be mounted inside the vehicle in advance before the vehicle is released in the market. But, there are few conventional head up display devices which can be purchased separately and mounted to the vehicle after the vehicle is released in the market. Also because a portable and external mounting type head up display device is mostly mounted in a space between a windshield and a dashboard, it is required to develop a head up display device which can be mounted also in a vehicle in which the space between the windshield and the dashboard is small.

Moreover, as a volume of the head up display device increases, the reflected image shakes more by vehicle vibration, and thus an image quality is degraded. Also because the image is projected using the entire mirror, there is a limitation in manufacturing the conventional head up display device compactly. Still further, in a case where a large element is used, the conventional head up display device needs a cooling system for solving a temperature rise problem, which results in a decrease in reliability and an increase in cost.

SUMMARY OF THE INVENTION

Accordingly, the present invention is directed to a head up display device that substantially obviates one or more problems due to limitations and disadvantages of the related art.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a head up display device comprises: a display unit to convert a signal into an image and output the image; an optical element decentered with respect to an optical axis of the display unit, the optical element magnifying the image and transmitting the image; and a combiner provided in front of a driver, the combiner providing the driver with the transmitted magnified image.

In accordance with another embodiment of the present invention, a head up display device comprising: a display unit to convert a signal into an image and output the image; an optical element provided in the same direction as the display unit with respect to an optical axis of the head up display device, the optical element having a size of half or less of an original full size with respect to the optical axis of the head up display device and magnifying the image and transmitting the image; and a combiner provided in front of a driver, the combiner providing the driver with the transmitted magnified image.

In accordance with yet another embodiment of the present invention, a head up display device comprising: a display unit to convert a signal into an image and output the image; an optical element provided in the different direction from the display unit with respect to an optical axis of the display unit, the optical element having a size of half or less of an original full size with respect to the optical axis and magnifying the image and transmitting the image; and a combiner provided in front of a driver, the combiner providing the driver with the transmitted magnified image.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention associated with a head up display device, examples of which are illustrated in the accompanying drawings. Wherever possible, the same reference numbers will be used throughout the drawings to refer to the same or like parts.

Figure 1:
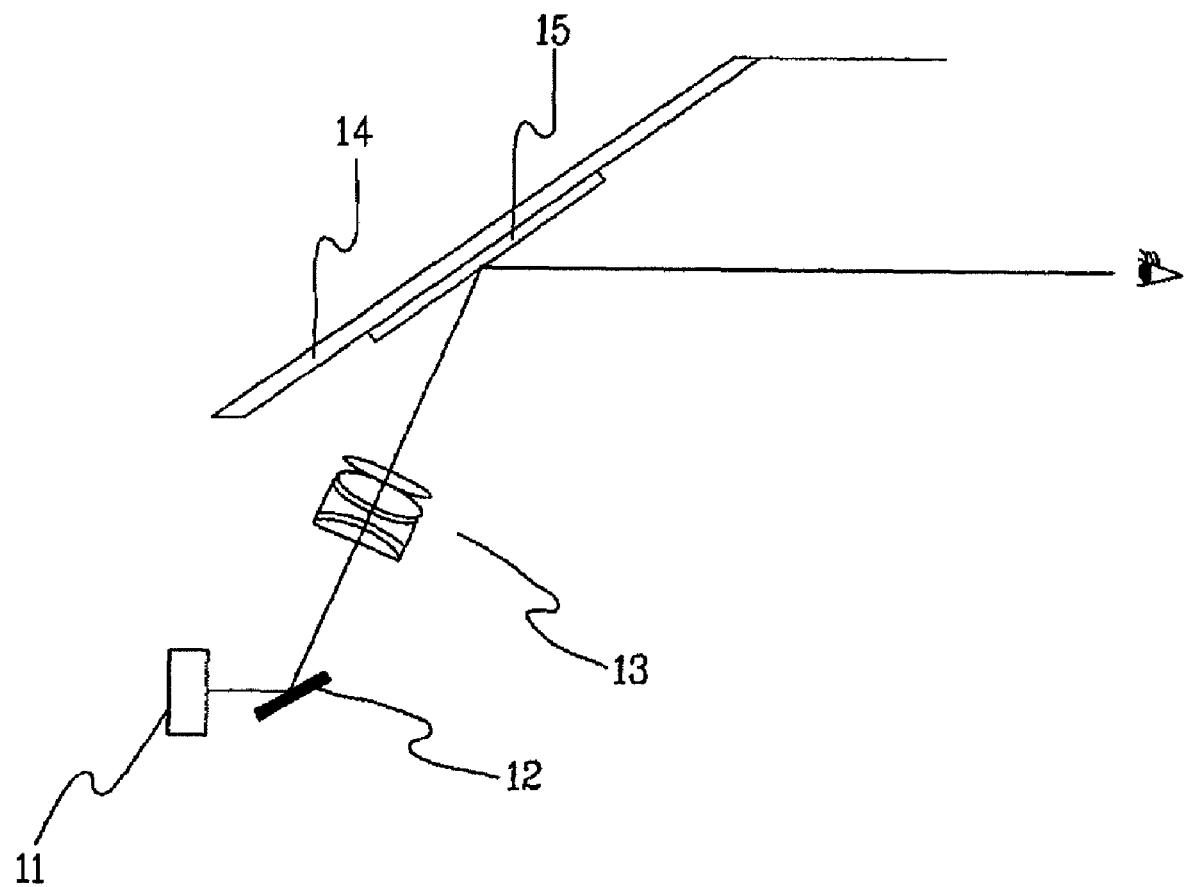
FIG. 1 is a view illustrating a schematic constitution of a conventional head up display device for a vehicle.
Figure 2:
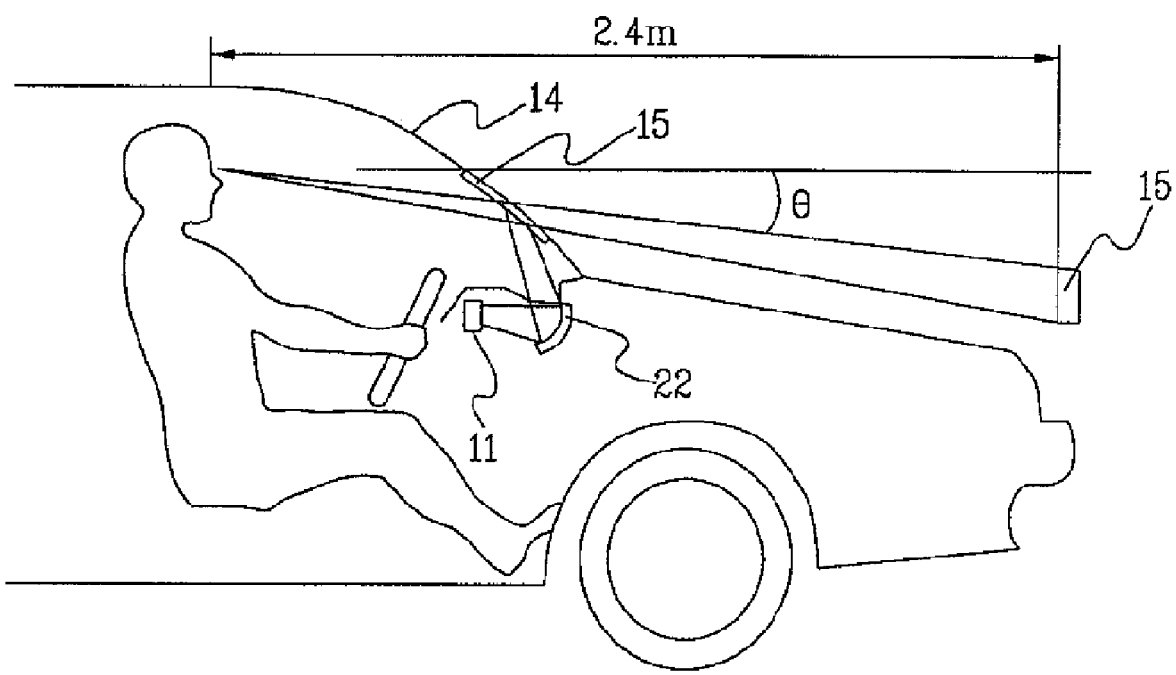
FIG. 2 is a view illustrating a vehicle mounted with the conventional head up display device for a vehicle.
Figure 3:
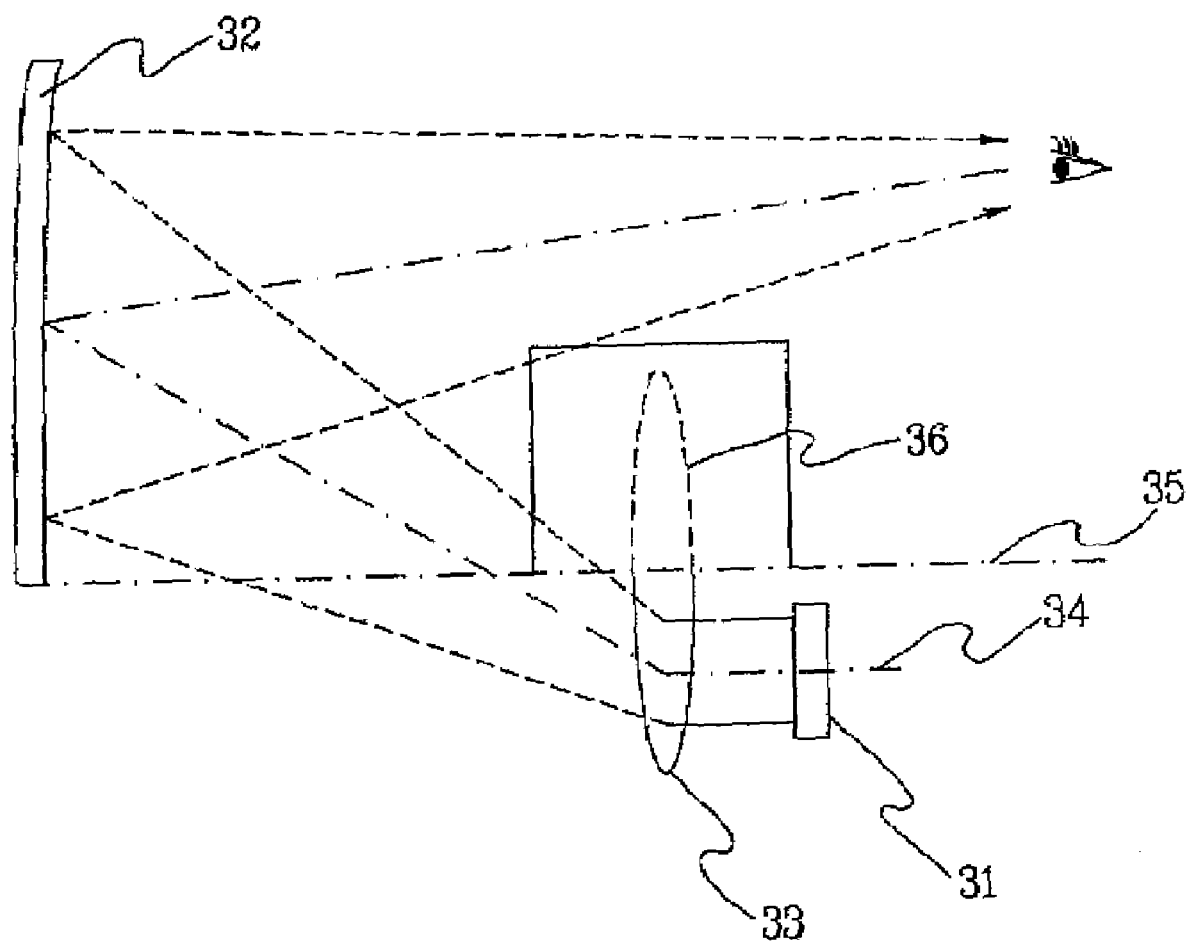
FIG. 3 is a view illustrating a schematic constitution of a head up display device according to an exemplary embodiment of the present invention.

FIG. 3 is a view illustrating a schematic constitution of a head up display device according to an exemplary embodiment of the present invention.

As shown in FIG. 3, a head up display device according to the present invention includes a display unit 31, an optical element 33, and a combiner 32. The display unit 31 converts a signal into an image, and outputs the image. The optical element 33 changes an optical path of the image outputted from the display unit 31 so as to direct the image toward the combiner 32. The combiner 32 changes an optical path of light from the optical element 33 so that a virtual image is generated at the front of a vehicle. The head up display device of this embodiment may further include a driving unit (not shown) to drive a light source or a display panel of the display unit (which will be described later), or to drive the optical element.

The display unit 31 may be configured as, for example, a liquid crystal display having a backlight as a light source, however the display unit 31 is not limited thereto. The display unit 31 may include a light source using an ultra high pressure (UHP) lamp, an LED, a laser or the like, and a display panel capable of microdisplay and scan display, such as an LCD, an LCOS, a DMD or the like. A reflective color LCD without a backlight may be used.

Also, the display unit 31 may be embodied in a reflective microdisplay type or a transmissive microdisplay type. Especially, in a case of the reflective type, either a single-plate type or a two-plate type can be applied by use of a polarizing beam splitter (PBS). The image outputted from the display unit 31 may be an image regarding information about vehicle driving states.

The combiner 32 may be configured as, for example, a plate-shaped half mirror or a hologram element. In a case where the half mirror is used as the combiner 32, the combiner 32 changes an optical path of light incident from the front of the vehicle by reflection. In this case, a reflectance can be adjusted, for example, by adjusting a reflection angle, or depending on a material coated on a front or rear surface of the combiner 32 and a thickness of the material thus coated.

On the other hand, in a case where the hologram element is used as the combiner 32, the combiner 32 changes an optical path of light incident from the front of the vehicle by diffraction. The combiner 32 changes an optical path of light incident from the optical element 33 so that a virtual image is generated at the front of the vehicle. Accordingly, a driver can perceive both the virtual image and the outside scenery viewed through the windshield.

The reflectance of the front surface of the combiner 32 may be different from the reflectance of the rear surface. Here, the front surface is defined as a surface directed toward the driver, and the rear surface is defined as a surface directed toward a vehicle driving direction. If the reflectance of the front surface of the combiner 32 is equal to the reflectance of the rear surface, a ghost image may be generated by an optical path difference between the image reflected from the front surface and the image reflected from the rear surface. This problem can be solved by making the reflectance of the front surface different from the reflectance of the rear surface to appropriately adjust the optical paths. A size of the virtual image is in proportion to a size of the combiner 32, and the combiner 32 has a size of half or less of an original full size with respect to an optical axis 35.

The light transmittance of the combiner 32 may be in the range of approximately 20 to 50%. If the light transmittance of the combiner 32 is smaller than 20%, the virtual image is projected too blurredly. If the light transmittance of the combiner 32 is larger than 50%, it is difficult for the driver to observe fully the traffic condition.

If the thickness of the combiner 32 is set to be 2 to 4 mm, the ghost image from the optical path difference is too small for the driver to perceive. By making a curvature of the front surface of the combiner 32 different from a curvature of the rear surface, the aforementioned problem of the optical path difference can be solved. For example, the radius of curvature of the rear surface is set to be larger than that of the front surface.

The optical element 33 is used to change the optical path of light so that the image outputted from the display unit 31 is incident to the combiner 32 at a predetermined angle. The optical element 33 is configured as a single lens which is decentered with respect to an optical axis 34 of the display unit 31 or the display panel provided in the display unit 31. The decentered single lens can prevent distortion of the virtual image. The decentered lens used in the optical system of the present invention may be configured as an off-axis and/or asymmetric aspheric lens.

Generally, an aspheric lens is used to solve aberration problems of a spherical lens, including spherical aberration generated when a focus is changed depending on a light incident position, comatic aberration generated by off-axis incident light, and/or an astigmatism generated at the front and rear of the focus. However, it is preferred that the aspheric lens used in the optical element 33 of the present invention is a lens having a surface for refracting the optical path at a predetermined angle with respect to the optical axis 34 and directing the light toward the combiner 32 at a desired angle.

Differently from a conventional head up display device in which an optical axis of a display panel (image formation surface) coincides with an optical axis of an optical system, the optical element 33 of the present invention changes the optical path so that the light passes through the decentered aspheric lens disposed below the optical axis 35 in the prior art and is directed upward and toward the combiner 32. Although it is illustrated in FIG. 3 that only the display unit 31 is decentered with respect to the optical axis, the optical element 33 also can be decentered.

Although it is illustrated in FIG. 3 that the optical element 33 and the display unit 31 are arranged in the same direction with respect to the optical axis, the optical element 33 and the display unit 31 can be arranged in different directions. Also as shown in the drawing, the optical element 33 can have a size of half or less of an original full size with respect to the optical axis. The display unit 31 can be disposed at either side from the optical axis of the head up display device.

An observer can observe the magnified virtual image, irrespective of the sizes of the display unit 31 and the optical element 33. Since only a half (or less) portion with respect to the optical axis 35 is used as an effective surface, the sizes of the components can be reduced, and the generation of distortion aberration can be restrained by the optimum use of the effective surface. Also, since a distance on the optical path between the optical element 33 and the aspheric combiner 32 can be decreased, the optical aberration problem is easily improved, and the performance of the display device is enhanced while reducing the overall size of the display device. Further, since the optical element 33 and the aspheric combiner 32 are arranged in such a way that they do not coincide with the optical axis 35, it can prevent a shadow area from being generated at the virtual image projected to the observer. Still further, the present invention solves the problems of that there are many limitations in manufacturing a conventional head up display device compactly, in which a reflective mirror should be additionally installed to project the virtual image in the upward direction, or the overall structure should be designed so that an upper portion 36 of the optical element protruding above the optical axis 35 does not obstruct the driver's field of vision.

In addition, since the combiner 32 is configured as an aspheric lens which can be used partially in a decentered manner similar to the optical element 33, the head up display device can be constituted more compactly. The display unit, the optical system and the combiner can be integrally formed in a housing. In this case, it is preferred that the combiner is rotatably mounted by a rotating support member such as a hinge in the housing so as to adjust the reflection angle.

The combiner 32 can be formed in a foldable manner in the housing. In other words, the combiner 32 is spread while the vehicle travels, and the combiner 32 is folded in the housing while the vehicle does not travel.

Figure 4A:
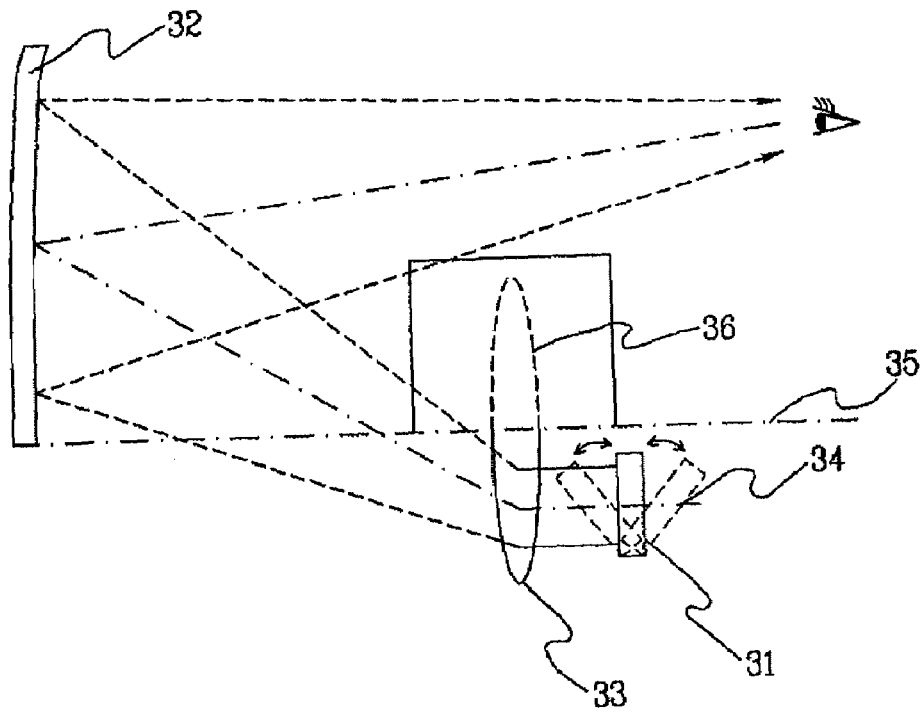
FIGS. 4A and 4B are views illustrating tilting and forward/backward movement of a display unit, respectively.
Figure 4B:
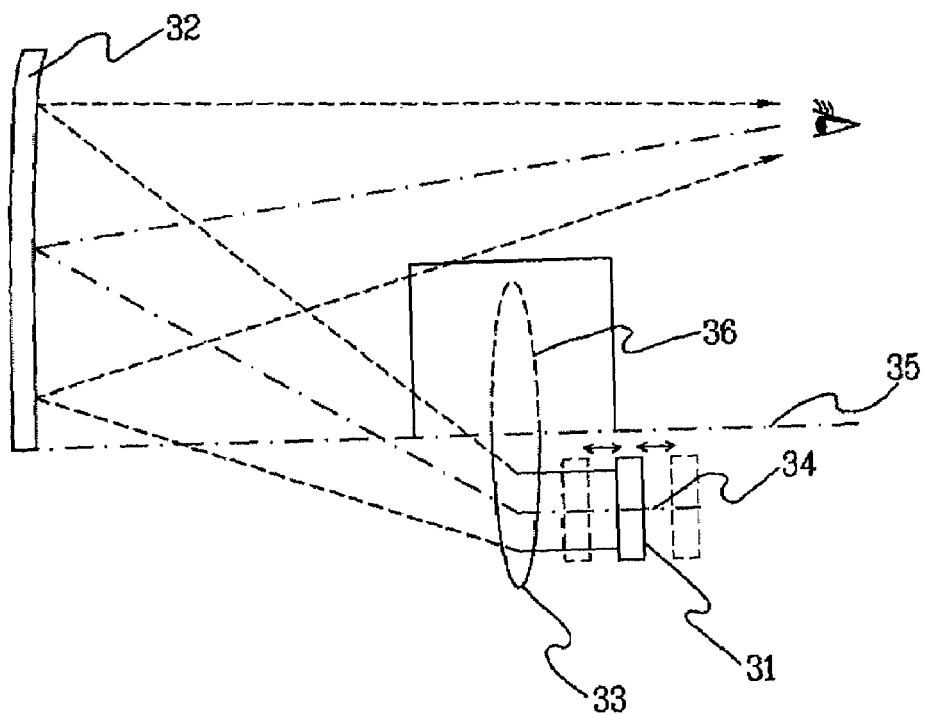

The display unit 31 may be provided in such a way that the display unit 31 can be tilted (refer to FIG. 4A) or can be moved forward and backward (refer to FIG. 4B). The display unit 31 can adjust a size of the projected image by being tilted or moved forward and backward. The combiner 32 may be provided in such a way that the combiner 32 can be tilted or can be moved forward and backward. In this case, the combiner 32 can correct the virtual image from being tilted and projected in a trapezoid shape.

As apparent from the above description, the head up display device for a vehicle according to the present invention can be constituted more compactly than a prior art and thus can be installed in a vehicle in which a space between a windshield and a dashboard is small, because the device uses the virtual image optical system including the decentered aspheric single lens and uses partially the combiner which is provided in a decentered manner.

Further, in a case where the display unit, the optical system and the combiner are integrally formed in the housing, the overall volume of the device is reduced. Accordingly, the assembling process is simplified, and manufacturing cost is saved.

Still further, the head up display device according to the present invention can be used in an air plane as well as in a navigation device for a vehicle. In addition, a windshield of a vehicle or airplane can be used as the combiner, the overall volume of the device is reduced, and a large-scale image is easily achieved.

It will be apparent to those skilled in the art that various modifications and variations can be made in the present invention without departing from the spirit or scope of the inventions.

For example, the above embodiments have described and shown that the optical system includes the decentered aspheric single lens. However, because the optical path can be adjusted at a more precise angle with more lenses, in a case where the precise adjustment of the optical path is required, the optical system including a plurality of lenses can be used.

Thus, it is intended that the present invention covers the modifications and variations of this invention provided they come within the scope of the appended claims and their equivalents.

What is claimed is:
1. A head up display device comprising:
a display unit to convert a signal into an image and output the image;
an optical element decentered with respect to an optical axis of the display unit, the optical element magnifying the image and transmitting the image; and
a combiner provided in front of a driver, the combiner providing the driver with the transmitted magnified image,
wherein the display unit is disposed on one side of a central axis perpendicular to a surface of the optical element and the combiner is disposed at the other side of the central axis perpendicular to a surface of the optical element,
wherein the display unit is arranged apart from a light incident surface of the optical element and the combiner is arranged apart from a light emitting surface of the optical element, and
wherein a light emitted from the display unit is transmitted to a surface portion located on one side of a line perpendicular to the central axis of the optical element.

2. The head up display device according to claim 1, wherein the image is an image regarding vehicle driving states.

3. The head up display device according to claim 1, wherein the optical element is configured as an aspheric lens.

4. The head up display device according to claim 1, wherein the display unit includes a light source and a display panel.

5. The head up display device according to claim 1, wherein the display unit the optical element and the combiner arc integrally formed in a housing.

6. The head up display device according to claim 5, wherein the combiner is provided in a foldable manner in the housing.

7. The head up display device according to claim 1, wherein the display unit is provided such that the display unit can be tilted or moved forward and backward.

8. The head up display device according to claim 1, wherein the combiner is provided such that the combiner can be tilted or moved forward and backward.

9. The head up display device according to claim 1, wherein the combiner is configured as an aspheric combiner.

10. The head up display device according to claim 1, wherein the combiner has a light transmittance from 20 to 50%.

11. The head up display device according to claim 1, wherein the display unit is decentered with respect to an optical axis of the head up display device.

12. The head up display device according to claim 1, wherein the combiner includes a front surface having a first curvature and a rear surface having a second curvature different from the first curvature.

13. The head tip display device according to claim 1, wherein the combiner has a reflection preventing layer formed on a rear surface.

14. The head up display device according to claim 1, wherein the combiner has a thickness from 2 to 4 mm.

15. The head up display device according to claim 1, wherein the image provided to the driver is a virtual image, and wherein the virtual image is generated at the front of a vehicle through a windshield of the vehicle.

16. The head up display device according to claim 1, wherein at least one of the optical element and the combiner has a size of half or less of an original full size with respect to the optical axis of the head up display device.

* * * * *